(12) United States Patent
Takahashi et al.

(10) Patent No.: US 6,328,336 B1
(45) Date of Patent: Dec. 11, 2001

(54) GAS GENERATING DEVICE FOR AIR BAG APPARATUS

(75) Inventors: Hiroyuki Takahashi; Hideo Nomura; Kiyoshi Yamamori; Shigeru Takeyama; Takuhiro Ono; Yoshikazu Kawauchi, all of Kanagawa (JP)

(73) Assignees: Matsushita Electric Industrial Co., Ltd., Kadoma; Miyata Industry Co., Ltd., Chigasaki, both of (JP)

( * ) Notice: Subject to any disclaimer, the term of this patent is extended or adjusted under 35 U.S.C. 154(b) by 0 days.

(21) Appl. No.: 08/913,958

(22) PCT Filed: Jan. 31, 1997

(86) PCT No.: PCT/JP97/00227

§ 371 Date: Dec. 15, 1997

§ 102(e) Date: Dec. 15, 1997

(87) PCT Pub. No.: WO97/28026

PCT Pub. Date: Aug. 7, 1997

(30) Foreign Application Priority Data

Jan. 31, 1996 (JP) .................................................. 8-016215
Oct. 7, 1996 (JP) .................................................. 8-266204

(51) Int. Cl.[7] .................................................. B60R 21/26
(52) U.S. Cl. .......................... 280/737; 280/740; 280/741
(58) Field of Search .................................. 280/737, 736, 280/740, 741, 742

(56) References Cited

U.S. PATENT DOCUMENTS

| 3,567,245 | * | 3/1971 | Ekstrom ................................ 280/737 |
| 3,638,964 | * | 2/1972 | Chute .................................... 280/736 |
| 5,711,547 | * | 1/1998 | Blumenthal et al. ................. 280/737 |

* cited by examiner

Primary Examiner—Brian L. Johnson
Assistant Examiner—Faye M. Fleming
(74) Attorney, Agent, or Firm—Armstrong, Westerman, Hattori, McLeland & Naughton, LLP (57) ABSTRACT

A gas generating apparatus for an air bag apparatus mounted in a vehicle or the like for introducing a gas into an air bag to inflate the same for protecting a passenger in the vehicle. The gas generating apparatus for the air bag apparatus according to the present invention ignites and burns a combustible fluid to increase its temperature to increase its pressure for inflating an air bag. The gas generating apparatus for the air bag apparatus includes accommodating device (5) and (9) each for accommodating a combustible fluid (7), a vent opening provided in one of the accommodating device (9), and an occluding member (13) having an igniting portion (14) directed inward of the accommodating device (9). A pressure in the accommodating device is increased by burning the combustible fluid to reliably break the occluding member so that a combustion fluid mixture can effectively and swiftly be supplied to the air bag.

16 Claims, 11 Drawing Sheets

GAS GENERATING DEVICE FOR AIR BAG APPARATUS

TECHNICAL FIELD

The present invention relates to a gas generating apparatus for an air bag apparatus mounted in a vehicle or the like for introducing a gas, at the time of collision of the vehicle, into an air bag for protecting a passenger or an occupant in the vehicle.

BACKGROUND ART

Conventionally, in the gas generating apparatus for the air bag apparatus, an inert gas such as a compressed nitrogen gas or argon gas is used. However, Japanese Patent Application Laid-open No. 5-278554 discloses an apparatus which uses a combustible gas mixture. In this apparatus, the combustible gas mixture accommodated in a pressure container is ignited and burnt from its one end surface, and when the gas pressure is increased due to a rise of the temperature by combustion, the other end surface of the pressure container is broken by such a pressure, which allows the combustion gas to flow therefrom into the air bag to inflate the same.

However, in the initial state in which the combustible gas mixture is ignited in the conventional apparatus as disclosed in this Japanese Patent Application Laid-open No. 5-278554, among the entire gas in the pressure container, only gas at the side of the ignition is burnt, and gas at the side of the other end surface is prone not to be burnt. Therefore, it is difficult to promptly supply the gas into the air bag, and to effectively utilize the entire combustible gas mixture.

Therefore, the object of the present invention is to provide a gas generating apparatus for an air bag apparatus in which a fluid mixture (which will be called as "combustion fluid mixture" hereinafter) generated after a combustible fluid mixture is burnt is effectively and swiftly fed into the air bag.

DISCLOSURE OF THE INVENTION

According to one aspect of the invention, there is provided a gas generating apparatus for an air bag apparatus for igniting and burning a combustible fluid to increase its temperature to increase its pressure for inflating an air bag, comprising: accommodating means for accommodating the combustible fluid; a vent opening provided in the accommodating means; and an occluding member for tightly closing the vent opening and having an igniting portion directed inward of the accommodating means. With this gas generating apparatus, a pressure in the accommodating means is increased by burning the combustible fluid. Therefore, the occluding member can reliably be broken, and the combustion fluid mixture can effectively and swiftly be supplied to the air bag. Further, because the occluding member includes the igniting portion, the occluding member can easily be manufactured, and a pressure resistance of the igniting portion of the present invention can be set lower than that required by a usual or normal igniting portion. Also, because the number of sealed portions are reduced, the airtight properties can be enhanced. Furthermore, because the occluding member having the igniting portion is disposed in the vicinity of the vent opening which supplies the combustion fluid mixture to the air bag, it is possible to suppress, to the utmost, a fluid mixture which is not yet burnt from being generated.

According to another aspect of the invention, in the above gas generating apparatus for an air bag apparatus, a breaking pressure of the occluding member is set lower than a breaking pressure of the accommodating means. Therefore, the occluding member can reliably be broken.

According to another aspect of the invention, in the above gas generating apparatus for an air bag apparatus, the occluding member comprises a cylindrical metal case having a flange, and a conductive member fixed in the cylindrical metal case through an insulator. Therefore, both a function of a burst disk and a function of an ignition can be realized with a simple structure.

According to another aspect of the invention, in the above gas generating apparatus for an air bag apparatus, the occluding member is broken from the flange of the metal case. Therefore, the occluding member can reliably be broken.

According to another aspect of the invention, in the above gas generating apparatus for an air bag apparatus the metal case is provided with a fragile portion, and the occluding member is broken from the fragile portion of the metal case. Therefore, the occluding member can reliably be broken.

According to another aspect of the invention, in the above gas generating apparatus for an air bag apparatus, the accommodating means includes occluding member cutting means. Therefore, the occluding member can reliably be broken.

According to another aspect of the invention, in the above gas generating apparatus for an air bag apparatus, the occluding member is broken from a joint portion between the metal case and the insulator. Therefore, the occluding member can reliably be broken.

According to claim 8, in the gas generating apparatus for an air bag apparatus according to claim 3, the insulator is provided with a fragile portion, and the occluding member is broken from the fragile portion or the insulator. Therefore, the occluding member can reliably be broken.

According to another aspect of the invention, in the above gas generating apparatus for an air bag apparatus, the occluding member comprises: a dome-like metal case which is provided with a flange and is further provided at a base portion of the metal case with a cylinder; and a conductive member fixed in the cylinder through an insulator. Because a pressure resistance is enhanced by forming the metal case into a dome-like shape, it is possible to reduce a thickness of the entire metal case.

According to another aspect of the invention, in the gas generating apparatus for an air bag apparatus, the occluding member comprises a bottomed cylindrical metal case having a flange, and a conductive member fixed to the metal case through an insulator such that the conductive member passes through the metal case. Therefore, a bottom of the metal case functions as a lid and thus, it is possible to weaken a shearing force applied to a joint portion between the metal case and the insulator.

According to another aspect the invention, in the above gas generating apparatus for an air bag apparatus, there is further provided a container for accommodating the occluding member as broken. It is possible to accommodate the occluding member as broken in the container.

According to another aspect of the invention, in the above gas generating apparatus for an air bag apparatus, there is further provided a container for accommodating the occluding member as broken, and the container includes an edge for cutting the flange of the metal case of the occluding member. Because the occluding member is mechanically cut by the edge, the cutting accuracy is high, and the flange of the metal case can be made thick and thus, it is possible to enhance a vibration resistance and a corrosion resistance.

According to another aspect of the invention, in the above gas generating apparatus for an air bag apparatus, there is further provided a diffuser which has a plurality of gas diffusing holes and which is disposed at outside of an end surface of the accommodating means such as to surround the vent opening, the container being disposed in the diffuser. Therefore, it is possible to accommodate the occluding member as broken in the container.

According to another aspect of the invention, in the above gas generating apparatus for an air bag apparatus, there is further provided a diffuser which has a plurality of gas diffusing holes and which is disposed at outside of an end surface of the accommodating means such as to surround the vent opening, the occluding member being fixed to the diffuser. Therefore, it is possible to prevent the occluding member from being scattered.

According to another aspect of the invention, in the above gas generating apparatus for an air bag apparatus wherein that distance of the insulator exposing inside of the accommodating means which is for preventing a creeping discharge between the conductive member and the metal case is greater than that distance of the insulator exposing outside of the accommodating means which is for preventing a creeping discharge between the conductive member and the metal case. Therefore, even if high static electricity is applied to the conductive member, such electricity can be discharged outside the accommodating member.

According to another aspect of the invention, in the above gas generating apparatus for an air bag apparatus, the distance of the insulator exposing outside of the accommodating means is equal to a distance between the conductive member and a projection provided at an opening end of the metal case. It is possible to set the distance of the insulator exposing inside of the accommodating means longer than the distance of the insulator exposing outside of the accommodating means.

According to another aspect of the invention, in the above gas generating apparatus for an air bag apparatus, the igniting portion includes a heating element and/or a pyrotechnic material. It is possible to effectively and swiftly supply the combustion fluid mixture into the air bag.

According to another aspect of the invention, there is provided an occluding member, comprising: a member for occluding a vent opening of accommodating means which accommodates a combustible fluid; and an igniting portion for igniting the combustible fluid. Therefore, it is possible to simplify the structure of the gas generating apparatus for the air bag apparatus.

According to another aspect of the invention, there is provided a gas generating apparatus for an air bag apparatus, comprising: a combustible fluid; accommodating means for accommodating said combustible fluid; occluding means for occluding a vent opening provided in the accommodating means; and igniting means for igniting the combustible fluid; the occluding means includes the igniting means. It is possible to swiftly inflate the air bag with a simple structure.

According to another aspect of the invention, there is provided a gas generating apparatus for an air bag apparatus, comprising: accommodating means for accommodating a combustible fluid; and occluding means for occluding a vent opening provided in the accommodating means and having igniting means for igniting the combustible fluid; the occluding means comprises a conductive material and an insulator, the conductive material and the insulator being connected with each other at least at one portion. It is possible to swiftly inflate the air bag with a simple structure.

According to another aspect of the invention, there is provided a gas generating apparatus for an air bag apparatus comprising: accommodating means for accommodating a fluid mixture; and occluding means for occluding a vent opening provided in the accommodating means; the occluding means includes igniting means and a combustible material. It is possible to swiftly inflate the air bag.

According to another aspect of the invention, in the above gas generating apparatus for an air bag apparatus the igniting means ignites at least the combustible material. It is possible to swiftly inflate the air bag.

According to another aspect of the invention, in the above gas generating apparatus for an air bag apparatus the combustible material includes at least one of a combustible solid matter, a combustible liquid and a combustible gas. It is possible to swiftly inflate the air bag.

BEST MODE FOR CARRYING OUT THE INVENTION

Figure 1:
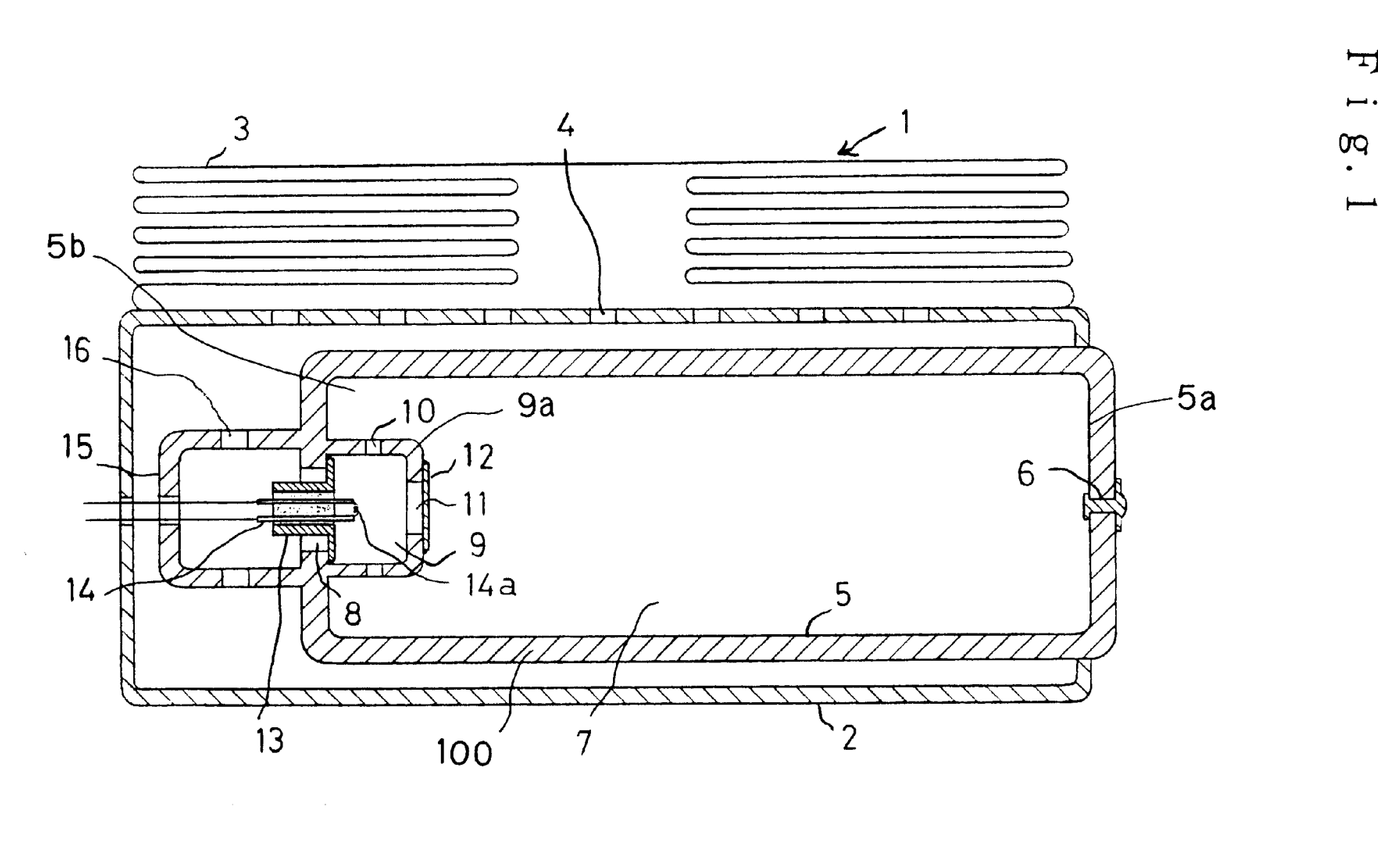
FIG. 1 is a sectional view of an air bag apparatus according to an embodiment of the present invention.

An embodiment of the present invention will be explained with reference to the drawings. FIG. 1 shows an arrangement of an air bag apparatus according to the embodiment of the invention. In FIG. 1, a reference numeral 1 denotes the entire air bag apparatus. A reference numeral 2 denotes a bottomed square cylindrical module case forming an outline of the air bag apparatus 1. An air bag 3 is mounted to the module case 2 which includes a plurality of fluid supply holes 4. The air bag 3 is folded in a normal condition. A reference numeral 100 denotes a gas generating apparatus for the air bag apparatus. A reference numeral 5 denotes a second chamber forming a pressure container. The second chamber 5 is provided at its one end 5a with a fluid charging opening 6 for charging combustible fluid mixture 7. The fluid charging opening 6 is sealed after a fluid is charged. A reference numeral 8 denotes a first vent opening formed in the other end 5b the second chamber 5. A reference numeral 9 denotes a first chamber forming a pressure container mounted to the inner side of the other end 5b of the second chamber 5 by means of welding, screw or the like such as to surround the first vent opening 8. The first and second chambers 9 and 5 are partitioned by a partition wall 9a. A reference numeral 11 denotes a second vent opening formed in the partition wall 9a. A reference numeral 10 denotes a third vent opening formed in a sidewall of the first chamber 9. The third vent opening 10 has a smaller sectional area and/or a longer length than that of the second chamber 5. A reference numeral 12 denotes a second occluding member mounted outside the partition wall 9a of the first chamber 9 such as to occlude the second vent opening 11. A reference numeral 13 denotes a first occluding member connected to the other end 5b of the second chamber 5 such to occlude the first vent opening 8. The first occluding member 13 includes an ignition 14. A reference numeral 14a denotes an igniting portion mounted in the first chamber 9. A destruction pressure of the first occluding member 13 is set such that it is destroyed or broken when a pressure within the first chamber 9 is increased. The ignition 14 ignites a combustible fluid mixture in the first chamber 9 upon reception of signal from a shock sensor or a deceleration sensor both of which are not shown. A reference numeral 15 denotes a diffuser mounted to the outside of the other end 5b of the second chamber 5 such as to surround the first vent opening 8. The diffuser 15 is formed at its sidewall with a fluid diffusing hole 16. It should be noted that the first chamber 9 may be unnecessary depending upon the required ejecting characteristics of the fluid, and thus is not indispensable element.

As the combustible fluid mixture 7, a mixture including an inert fluid, a combustible fluid and an oxidizer fluid is used. A preferable inert fluid is nitrogen, argon, helium or a mixture thereof. The combustible fluid may be hydrogen, lower hydrocarbon (the number of carbons is 1 to 3), lower alcohol, lower ether and the like or a mixture thereof. A preferable oxidizer fluid is oxygen. Air may be used as a mixture of the inert fluid and oxidizer fluid. As the combustible fluid mixture 7, a mixed fluid may be used which does not includes an inert fluid, but the density of combustible fluid is extremely low and oxidizer fluid in an amount sufficiently greater than necessary mount for burning the combustible fluid. Further, the combustible fluid mixture 7 may be comprised of a composition that is brought into a combustible range just before or simultaneously with the combustible fluid is ignited. In this case, just before or simultaneously with the combustible fluid is ignited, the oxidizer fluid or a mixture of the oxidizer fluid and the inert fluid is mixed with the combustible fluid.

Further, the combustible fluid mixture 7 may be a gas mixture or a liquid mixture.

Next, the operation in the above described first embodiment will be explained. In the drawings, it should be noted that any part denoted by the same reference number indicates the same element. The combustible fluid mixture 7 is charged in its pressurized state into the second chamber 5 through the fluid charging opening 6, and charged into the first chamber 9 and the second chamber 5 under equal pressures. When a vehicle is rapidly decelerated due to a collision, the ignition 14 ignites the combustible fluid mixture 7 within the first chamber 9 by the signal from the shock sensor or the deceleration sensor. When the combustible fluid mixture 7 starts burning, the pressure in the first chamber 9 is increased. When the pressure within the first chamber 9 reaches about twice as high as the charging pressure, a fragile portion of the first occluding member 13 is broken. And the combustion fluid mixture is introduced from the first chamber 9 through the first vent opening 8 and the diffuser 15 into the air bag 3.

Figure 2:
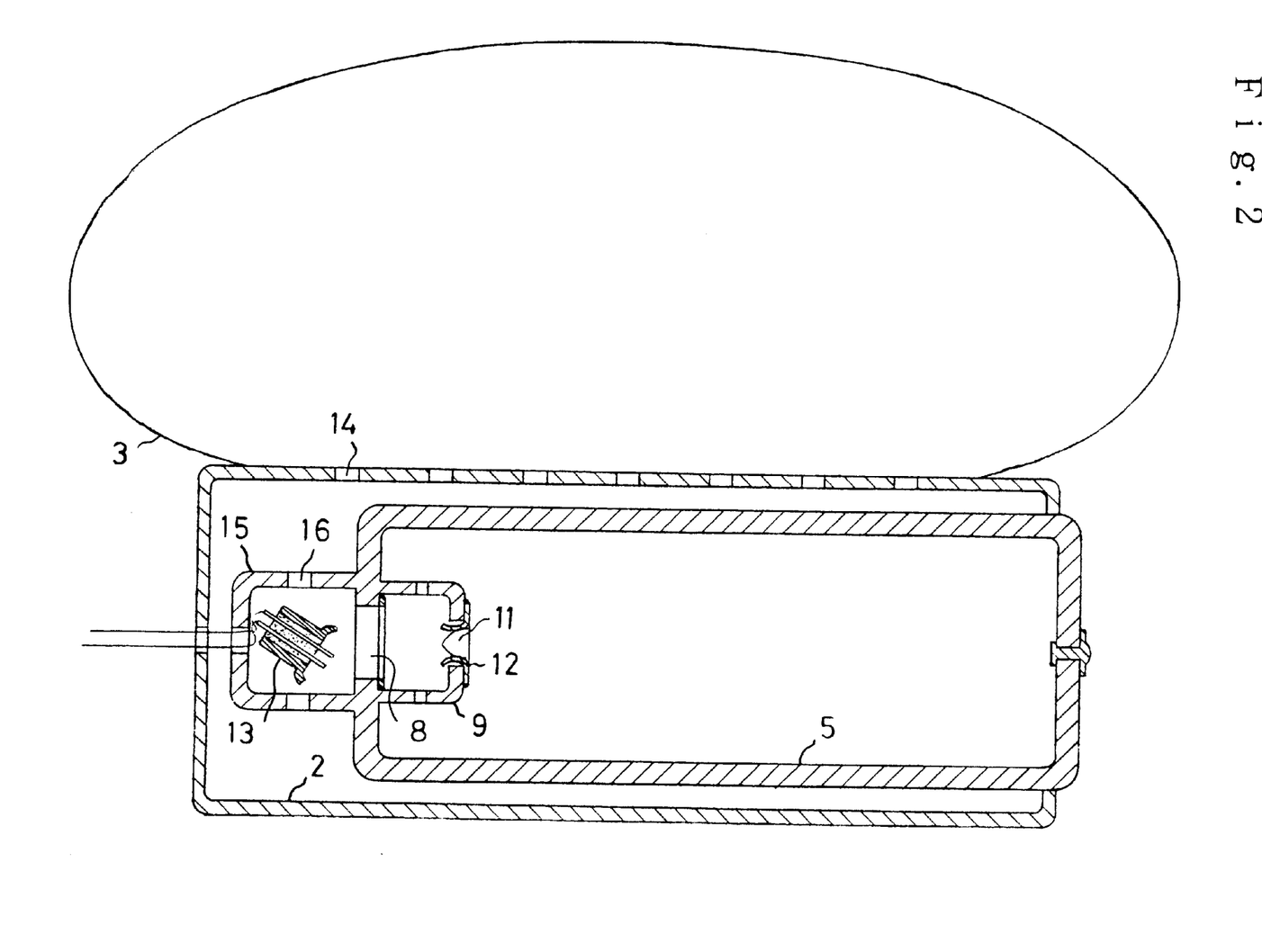
FIG. 2 is a sectional view the air bag apparatus in a state where a first occluding member having an ignition is broken according to the embodiment.

During that time, at least a portion of the combustion fluid mixture in the first chamber 9 is introduced into the second chamber 5 through the third vent opening 10 to start burning the combustible fluid mixture 7 in the second chamber 5, thereby slowly increasing the pressure in the second chamber 5. The pressure in the first chamber 9 is rapidly decreased by outflow of the combustion fluid mixture due to the break of the first occluding member 13 and therefore, a difference between a pressure in the first chamber 9 and a pressure in the second chamber 5 becomes large. When the difference in pressure reaches a predetermined value, a fragile portion of the second occluding member 12 is broken to bring the first and second chambers 9 and 5 into communication with each other. The combustion fluid mixture in the second chamber 5 is passed through the second vent opening 11 and introduced through the first chamber 5 and the diffuser 15 into the air bag 3. FIG. 2 shows such a state. The combustion fluid mixture flows out from the second vent opening 11 and thus, the pressure in the second chamber 5 is once decreased. However, because the combustible fluid which was not yet burnt within the second chamber 5 is subsequently burnt, the pressure within the second chamber 5 is balanced or slightly increased to supply the combustion fluid mixture from the second vent opening 11 through the first vent opening 8 into the air bag 3 until the combustible fluid in the second chamber 5 is completely burnt.

Figure 3:
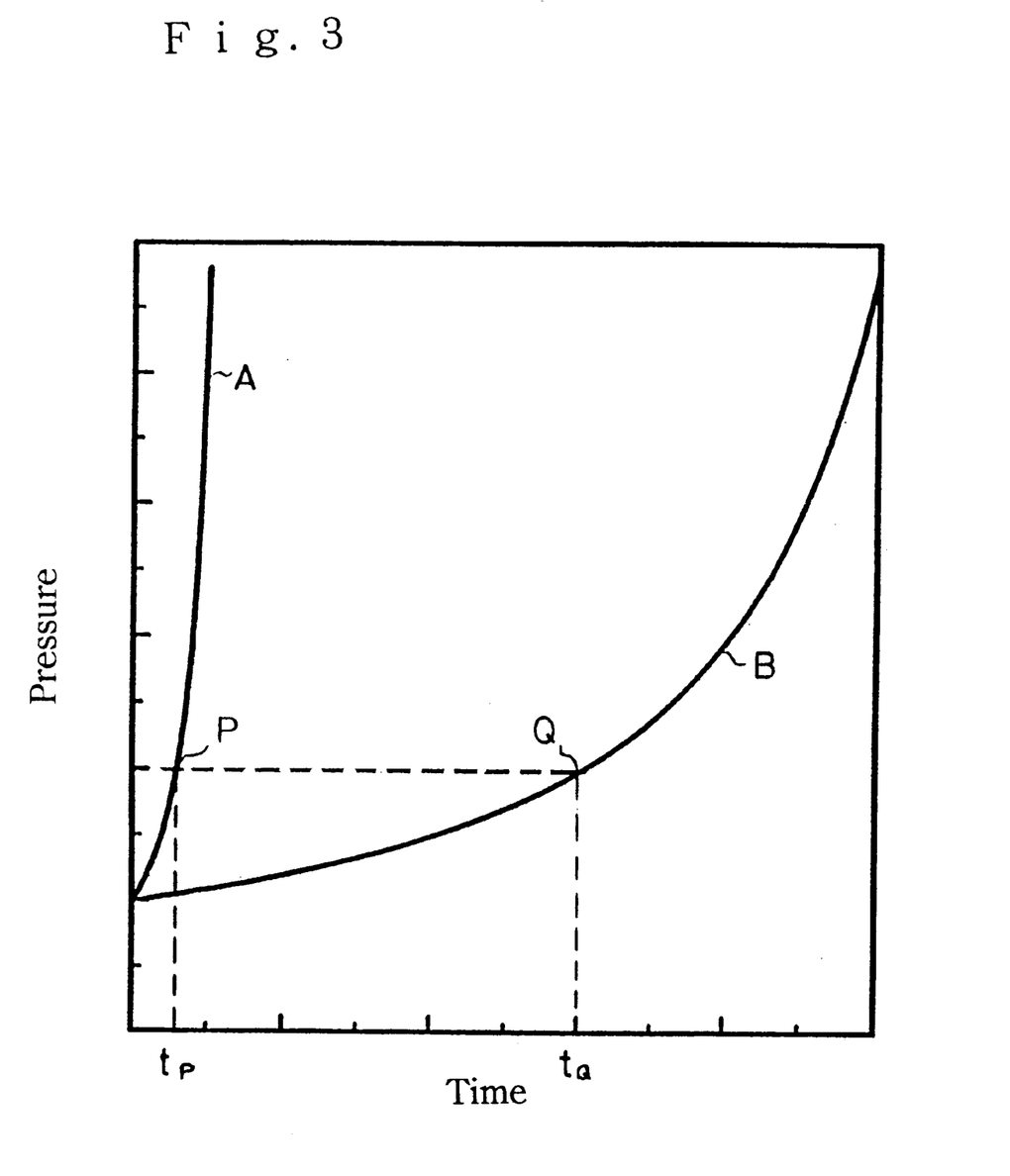
FIG. 3 is a graph showing a characteristic of relationship between a fluid pressure and time in a state where a first chamber and a second chamber are independent from each other according to the embodiment.

FIG. 3 shows modification in pressure rise as time passes within the first chamber 9 and the second chamber 5 according to the embodiment. In FIG. 3, a curve A indicates a pressure rise within the first chamber 9, and a curve B indicates a pressure rise within the second chamber 5. The pressure rise in each of the first and the second chambers 9 and 5 shown in FIG. 3 was measured independently in a condition that both the first occluding member 13 and the second occluding member 12 were set not to be broken and a volume of the first chamber is set substantially one ten of a volume of the second chamber 5. As is apparent from comparison between the point E and the point Q in FIG. 3, time required to reach the predetermined destruction pressure in the first chamber 9 having a small volume than the second chamber 5 is shorter, by (tQ-tP), than time required to reach the predetermined destruction pressure in the second chamber 5.

Figure 4:
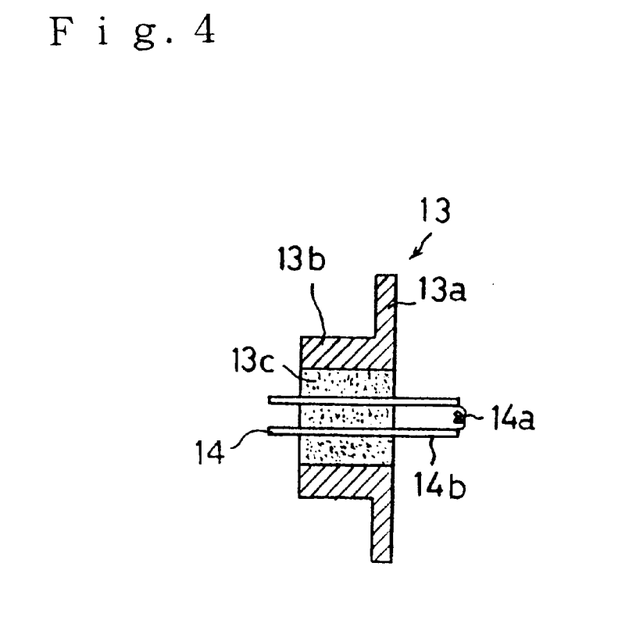
FIG. 4 is an enlarged sectional view of the first occuluding member according to the embodiment.

FIG. 4 shows, in detail, the first occluding member 13 of the above described embodiment. The first occluding member 13 comprises a cylindrical metal case 13b having a flange 13a, and a conductive member 14b of the ignition 14 sealed in the metal case 13b through a ceramic 13c. If the combustible fluid mixture burns, the pressure in the first chamber 9 is increased, and the flange 13a is abutted against an edge portion of the first vent opening 8 and is cut off. The first vent opening 8 and its surrounding may be provided with cutting means such as projections.

Figure 5:
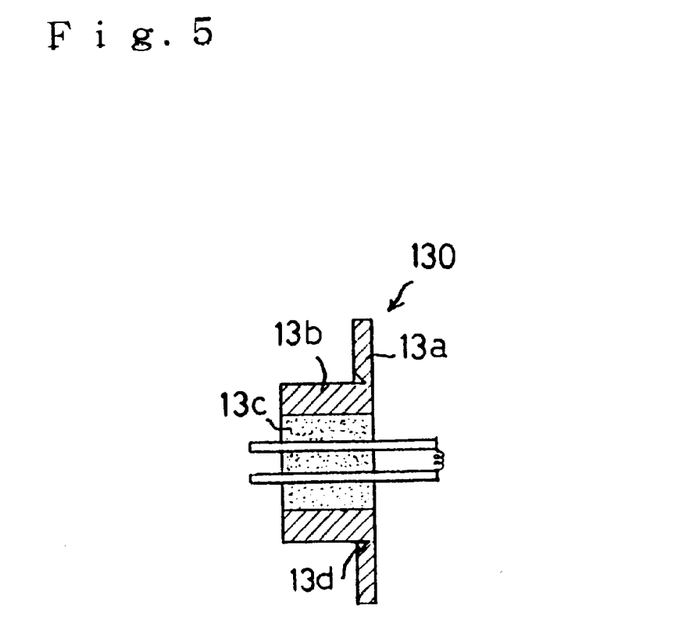
FIG. 5 is an enlarged sectional view of another example of the first occluding member of the embodiment.
Figure 6:
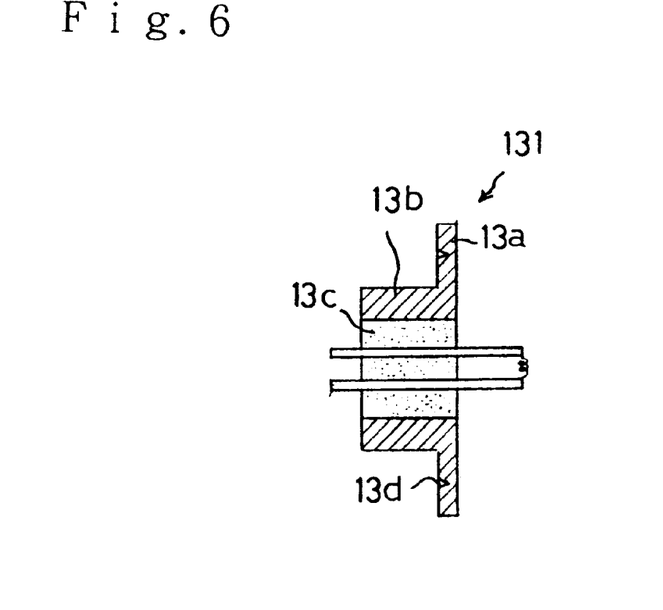
FIG. 6 is an enlarged sectional view of another example of the first occluding member of the embodiment.
Figure 7:
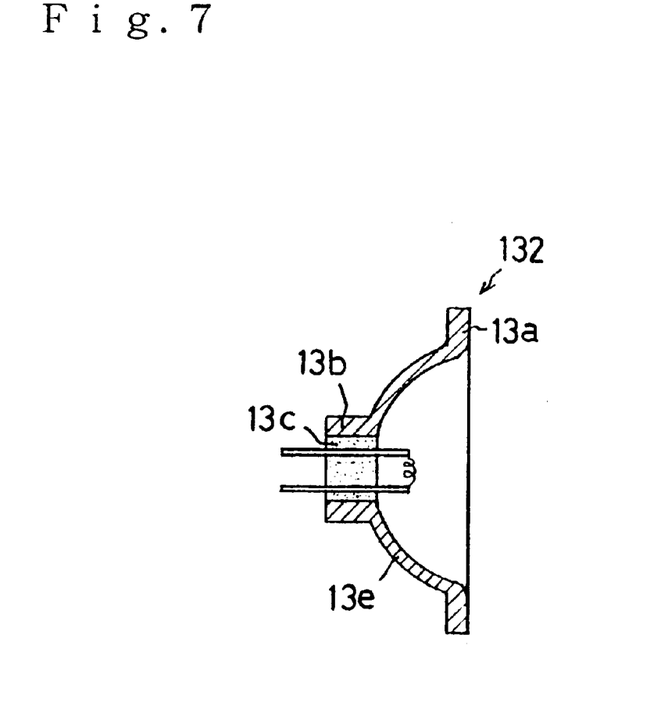
FIG. 7 is an enlarged sectional view of another example of the first occluding member of the embodiment.

FIG. 5 shows a first occluding member 130. The first occluding member 130 includes a fragile portion 13d provided at the base portion of the flange 13a by notching, and the first occluding member 130 is broken from the fragile portion 13d. The fragile portion 13d may be provided at the entire periphery or a portion of the flange 13a. FIG. 6 shows a first occluding member 131. This first occluding member 131 includes the flange 13a which is formed at its central portion with a circular fragile portion 13d by notching. The first occluding member 131 is broken from the fragile portion 13d. FIG. 7 further shows a first occluding member 132 having a dome 13e formed between the flange 13a and the metal case 13b. The pressure resistance of the first occluding member 132 is enhanced by the dome 13e, the entire thickness can be reduced.

Figure 8:
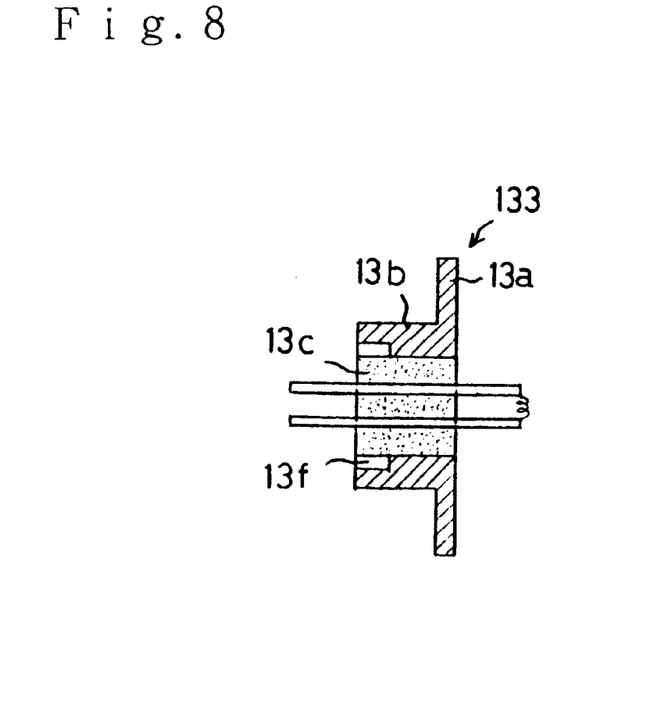
FIG. 8 is an enlarged sectional view of another example of the first occluding member of the embodiment.

FIG. 8 shows a first occluding member 133. The first occluding member 133 includes a non-contacted portion 13f between the metal case 13b and the ceramic 13c. The non-contacted portion 13f is formed by notching the entire inner peripheral surface of one end portion of the metal case 13b. A connecting strength between the metal case 13b and the ceramic 13c is lowered by this non-contacted portion 13f and thus, the first occluding member 133 is broken from the non-contacted portion 13f.

Figure 9:
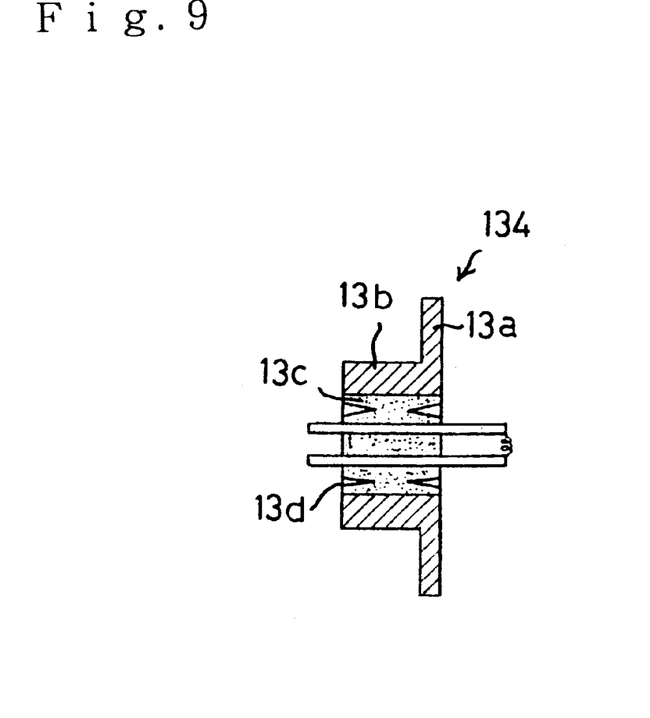
FIG. 9 is an enlarged sectional view of another example of the first occluding member of the embodiment.
Figure 10:
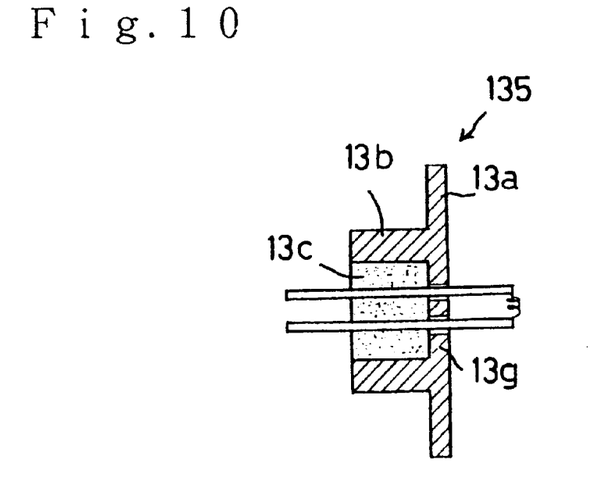
FIG. 10 is an enlarged sectional view of another example of the first occluding member of the embodiment.

FIG. 9 shows another example of a first occluding member 134. The first occluding member 134 includes a fragile portion 13d formed in the ceramic 13c by notching, and the first occluding member 134 is broken from the fragile portion 13d. FIG. 10 shows another example of a first occluding member 135. The first occluding member 135 includes a bottom 13g at the cylindrical metal case 13b at the side of the first chamber 9. When first occluding member 135 receives a pressure, the bottom 13g prevents a shearing force from being generated at the connected portion between the metal case 13b and the ceramic 13c, thereby stabling a breaking properties. The first occluding member 135 is broken from the flange 13a.

Figure 11:
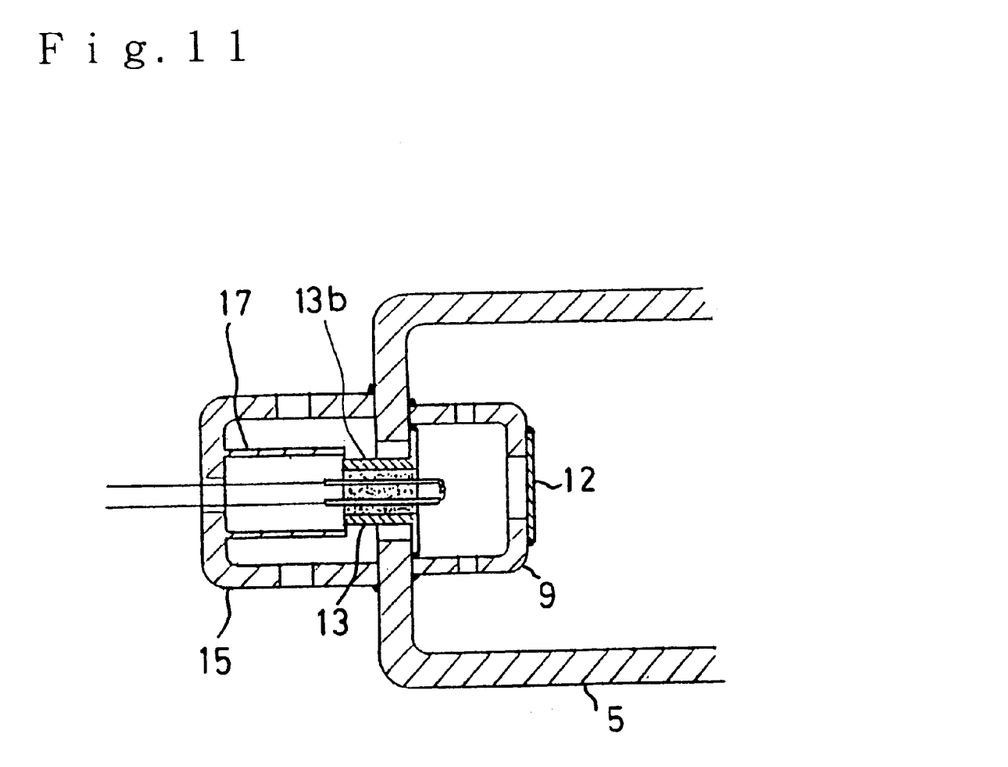
FIG. 11 is a partially sectional view of a catching structure of the broken first occluding member of the embodiment.

FIG. 11 shows a modification of the diffuser 15. In the present embodiment, the diffuser 15 is provided with a container 17 therein for receiving the broken first occluding member 13. The container 17 is formed cylindrically and having an inner diameter slightly greater than an outer size of the metal case 13b of the first occluding member 13. One end of the container 17 is secured to the diffuser 15 and the other end thereof is close to the first occluding member 13.

Figure 12:
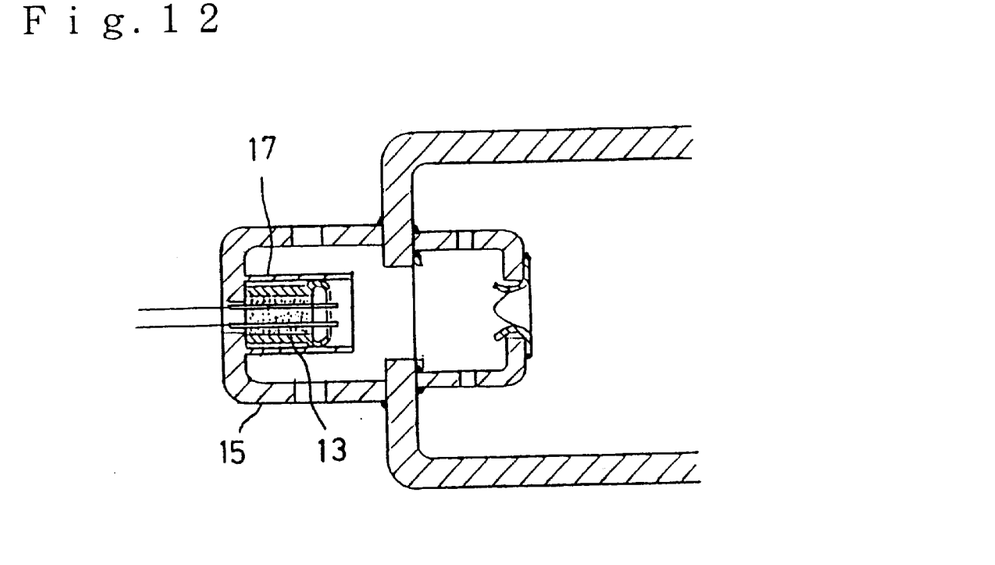
FIG. 12 is a partially sectional view of the catching structure shown in FIG. 11 in a state after the first occluding member is broken.

Therefore, when a pressure in the first chamber 9 is increased due to the combustion of the combustible fluid mixture, and the first occluding member 13 is broken, the broken first occluding member 13 is received in the container 17 as shown in FIG. 12. The broken first occluding member 13 is inserted up to the one end of the container 17 by the pressure and is held there.

Figure 13:
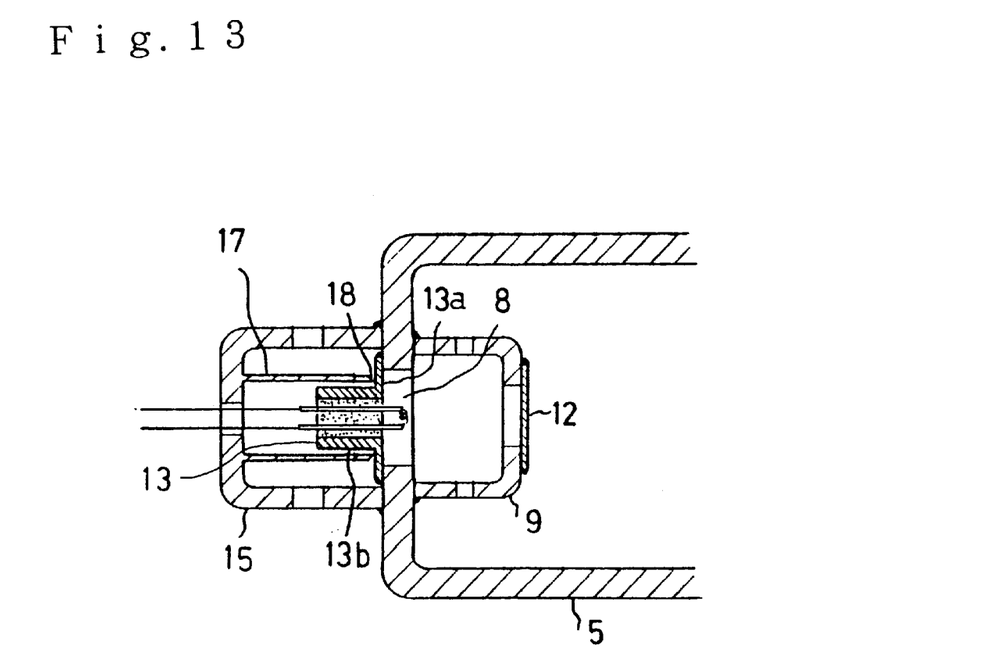
FIG. 13 is a partially sectional view of another example of the catching structure of the broken first occluding member of the embodiment.

FIG. 13 shows another modification of the first occluding member 13 having the container 17 in the diffuser 15 as in the above described modification. In the present modification, a sharp cutter 18 is provided at the entire periphery of the other end of the container 17. The container 17 has a length such that a portion of the first occluding member 13 is located within the container 17. The flange 13a of the first occluding member 13 is connected to the outside of the second chamber 5. The cutter 18 is provided such that it abuts against the flange 13a.

Therefore, when the pressure in the first chamber 9 is increased by the combustion of the combustible fluid mixture, the first occluding member 13 is pushed from the side of the first chamber 9, and the flange 13a is cut off by the cutter 18. The broken first occluding member 13 is received in the container 17. The combustion fluid mixtures in the first and the second chambers 9 and 5 are introduced into the diffuser 15 through a space between the cutter 18 and the second chamber 5.

Figure 14:
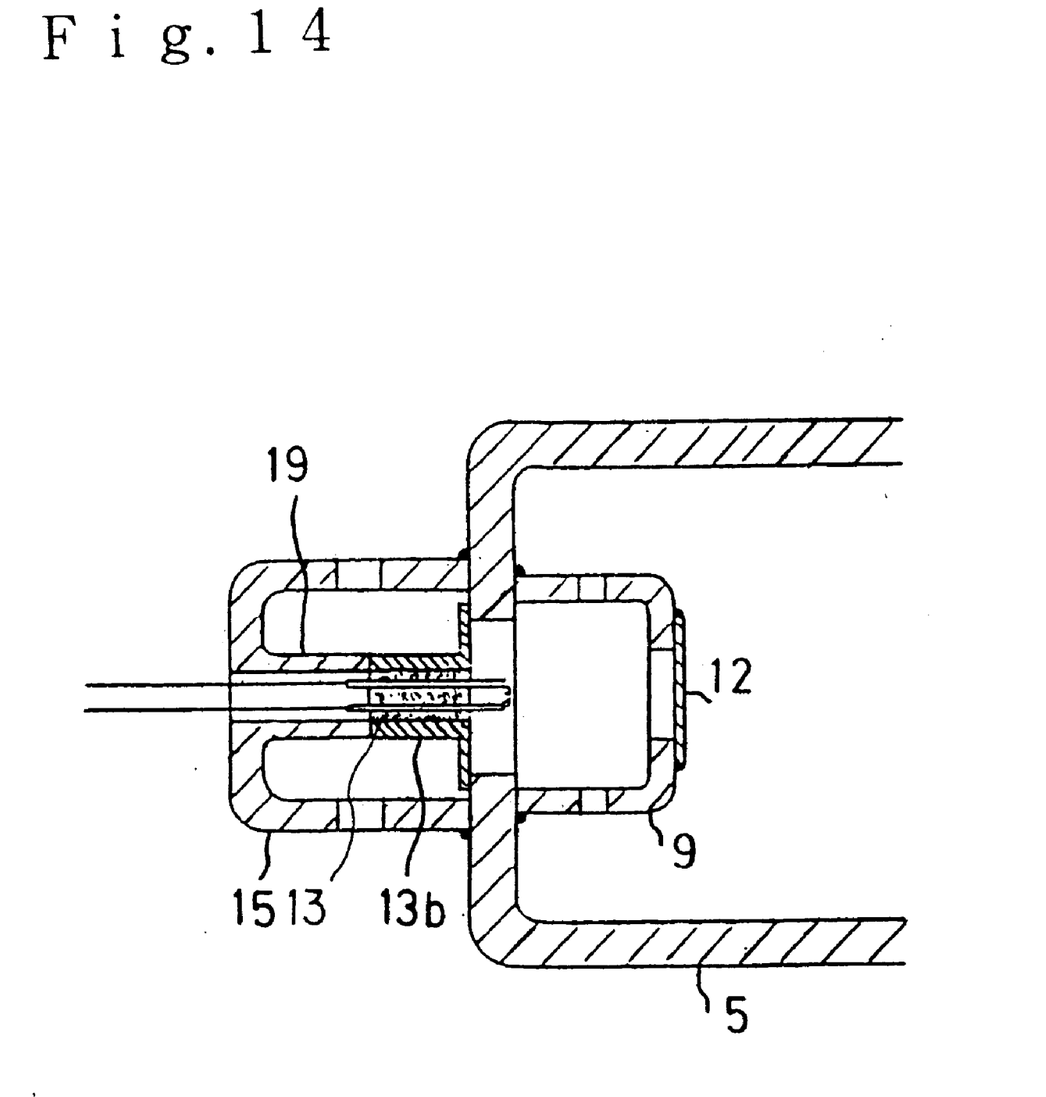
FIG. 14 is a partially sectional view of another example of the catching structure of the broken first occluding member of the embodiment.

FIG. 14 shows another modification of first occluding member 13 secured to a column 19 provided in the diffuser 15. The flange 13a of the first occluding member 13 is connected to the outside of the second chamber 5. When the combustible fluid mixture is burnt and a pressure in the first chamber 9 is increased, the flange 13a of the first occluding member 13 is broken. The first occluding member 13 is secured to the column 19 and therefore, the first occluding member 13 is not scattered. The combustion fluid mixtures in the first and the second chambers 9 and 5 are introduced into the diffuser 15 from the surrounding of the broken flange 13a.

As another means for catching the broken first occluding member 13, the diffuser 15 may be provided at its bottom with a magnet for catching the broken first occluding member 13.

Figure 15:
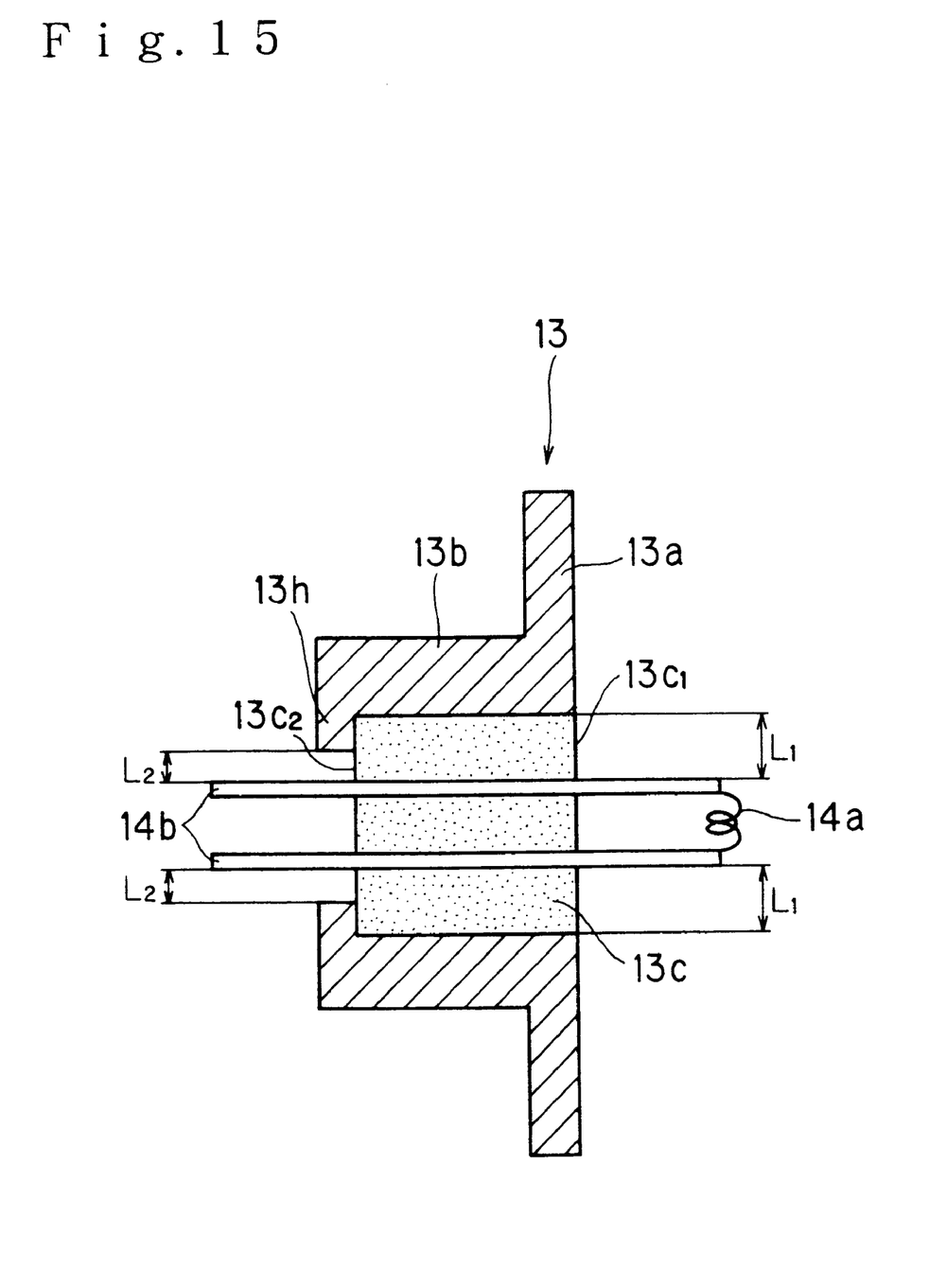
FIG. 15 is an enlarged sectional view of another example of the first occluding member of the embodiment.

FIG. 15 shows another modification of the first occluding member 13. This modification can be applied to any of the above described examples of the first occluding member. According to this modification, when a static electricity is applied to the ignition from outside for some reason, such electricity is discharged outside the second chamber.

More specifically, that distance of a surface of the ceramic 13c which is for preventing a creeping discharge between the conductive member 14b and the metal case 13b is set such that a distance L1 of a surface of the ceramic 13c inside the first chamber 9 is greater than a distance L2 of a surface of the ceramic 13c outside the first chamber 9, as shown in FIG. 15.

According to this modification, in order to make the distance L1 of the surface of the ceramic 13c inside the first chamber 9 greater than the distance L2 of the surface of the ceramic 13c outside the first chamber 9, the metal case 13b of the first occluding member 13 is provided with a flange 13h such that the flange 13h covers a portion of the outer periphery of the end face of the ceramic 13c outside the first chamber 9. Therefore, the flange 13h projects toward the conductive member 14b on the end face of the ceramic 13c so that a distance of the surface of the ceramic 13c to the conductive member 14b can be shortened. In other words, the distances L1 and L2 between the conductive member 14b of the ignition 14 and the metal case 13b on the surfaces 13c1 and 13c2 inside and outside the first chamber 9 of the ceramic 13c, respectively, are set different from each other. In this modification as illustrated in FIG. 15, the distance L1 of the surface 13c1 is at least twice as long as the distance L2 of the surface 13c2.

For example, when the distances of the surfaces 13c1 and 13c2 of the ceramic 13c which generate creeping discharge are substantially the same, when a high static electricity is applied to the conductive member 14b of the ignition 14, an electric discharge may be occurred in the first chamber 9. Whereas, by shortening the distance L2 of the surface 13c2 of the ceramic 13c with a simple structure of the metal case 13b, even if a high static electricity is applied to the conductive member 14b, such electricity can be discharged outside the gas generating apparatus.

It should be noted that a distance generating a creeping discharge differs depending upon a condition of a surface of an insulator. Therefore, the same effect can be obtained by changing states of the surfaces 13c1 and 13c2 of the ceramic 13c, instead of providing the flange 13h as in the above described modification.

The metal case 13b of the first occluding member 13 is provided at its one end at the side of the first chamber 9 with a flange 13a projecting outward. When the combustible fluid mixture in the first chamber 9 starts burning and the pressure is increased, stresses are concentrated on the flange 13a to break the first occluding member 13.

In the above described modifications, although the combustible fluid mixture is ignited by exothermic resistor such as a filament, other means such as a squib or spark plug may be used. In addition, spark means, means for generating a frictional heat, or means for igniting the combustible fluid mixture using catalyst reaction may also be used.

Next, an embodiment in which an occluding means includes a combustible material will be described below.

Figure 16:
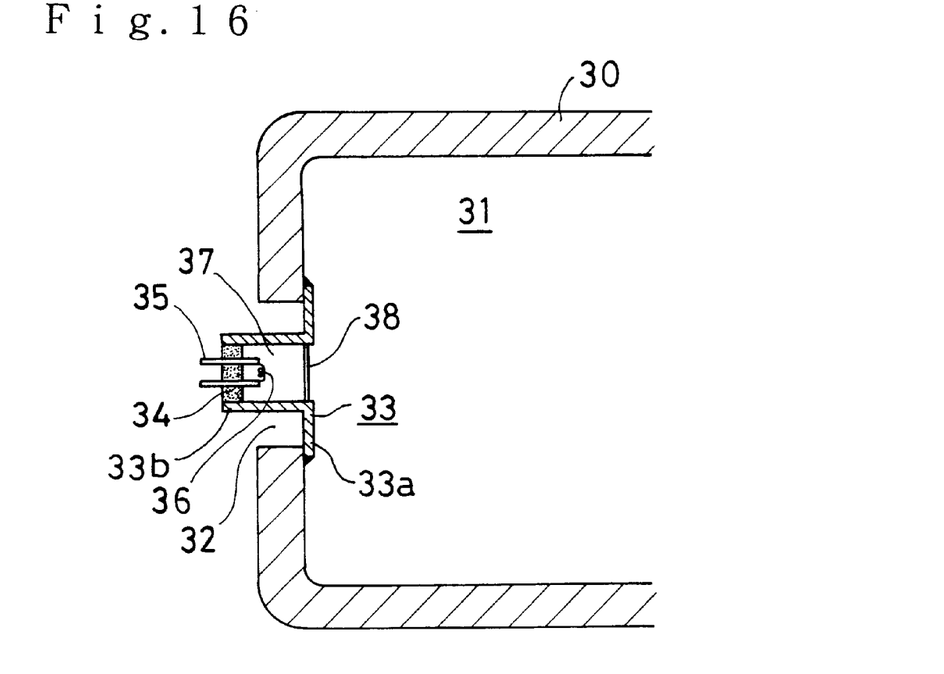
FIG. 16 is an enlarged sectional view of another example of the first occluding member of the embodiment.

FIG. 16 shows an example of an occluding means having an igniting means and a combustible material. A reference numeral 30 denotes a pressure container for the gas generating apparatus. A reference numeral 31 denotes the combustible fluid mixture. A reference numeral 32 denotes a vent opening provided in the pressure container 30. The vent opening 32 is occluded by the occluding member 33. The occluding member 33 includes a flange 33a, a metal case 33b and an insulator 34. A conductive member 35 is passed through the insulator 34, and an exothermic resistor 36 is provided on one end of the conductive member 35. A combustible material is accommodated in a space 37 defined by the metal case 33b, the insulator 34 and the lid 38.

The operation of the embodiment will be described below. The exothermic resistor 36 generates heat by a signal from a sensor which is not shown to ignites the combustible material. The combustible material is burnt and a pressure in the space 37 is increased. When the pressure in the space 37 reaches a predetermined value, the lid 38 is broken. At the same time, the burning combustible material ignites the combustible fluid mixture 31 in the pressure container 30. The pressure in the pressure container 30 is increased by the combustion of the combustible fluid mixture 31. When the pressure in the pressure container 30 reaches a predetermined value, the occluding member 33 is broken, and the combustion fluid mixture is introduced into the air bag.

Figure 17:
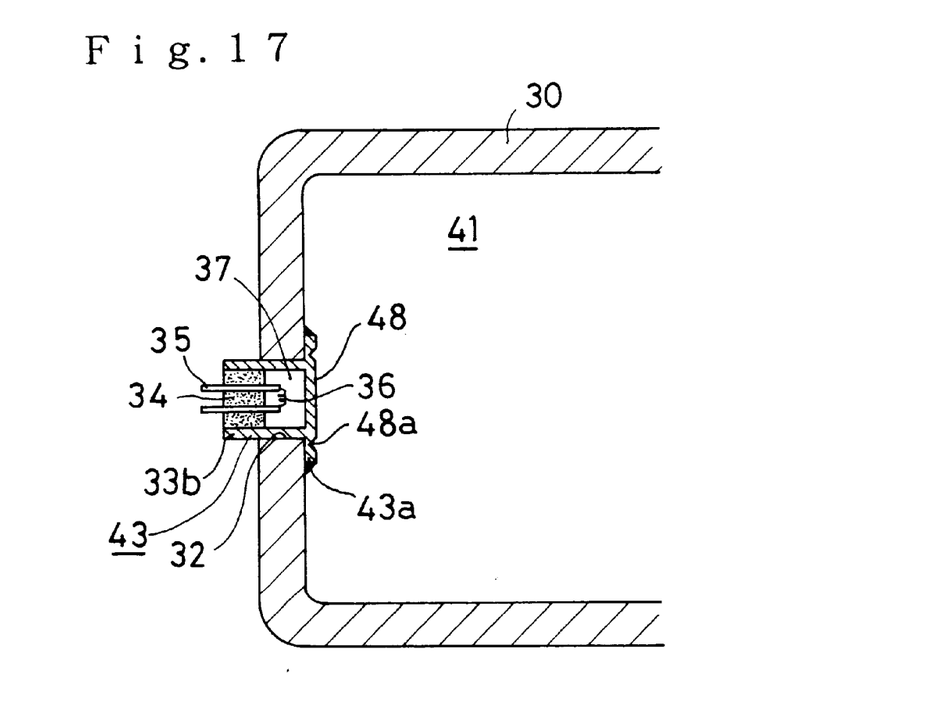
FIG. 17 is an enlarged sectional view of another example of the first occluding member of the embodiment.

FIG. 17 shows another embodiment in which the occluding member itself is broken by the combustion of the combustible material. The same reference numerals as those used in FIG. 16 denote the same elements. An occluding member 43 includes a flange 43a which has a minimum size for mounting the occluding member 43 to the pressure container 30. A lid 48 which is to be broken by the combustion of the combustible material has a size enough to cover substantially the entire surface of the vent opening, and is provided with a notch 48a at boundary between the lid 48 and the flange 43a.

The operation of this embodiment will be described below. When a combustible material accommodated in the space 37 is burnt, and a pressure in the space 37 reaches a predetermined value, the lid 48 is broken. The occluding member 43 is separated from the vent opening by the destruction of the lid 48. The burning combustible material ignites the combustible fluid mixture 41 in the pressure container 30. Therefore, the combustible fluid 41 is burnt and introduced into the air bag.

In the above described embodiments, the combustible material accommodated in the space 37 may be a combustible solid matter such as pyrotechnic material, or a combustible fluid. Further, the lid may not be closed tightly, and may be provided at a portion thereof with a hole.

Further, in the above described embodiments, although the pressure container 30 contains the combustible fluid mixture 31 or 41, the pressure container 30 may contain an inert fluid rather than the combustible fluid.

Although the occluding member preferably form an airtight seal by cooperation with the insulator and the metal case, the occluding may form such an airtight seal by cooperation with the lid and the metal case. Further, the lid may be a portion of a case for accommodating the combustible material.

The above described embodiments can be applied to a case in which the pressure container 30 is divided into a first and second chambers.

POSSIBILITY OF INDUSTRIAL UTILIZATION

As is apparent from the above described embodiments, according to the present invention, the combustible fluid mixture in the pressure container is ignited to increase the pressure of the combustible fluid in an instant, and the occluding member is broken by the increase fluid pressure to swiftly supply the resultant combustion fluid mixture into the air bag. Therefore, it is possible to provide a reliably gas generating apparatus for an air bag apparatus having a high response speed with a simple structure.

Because the occluding member of the present invention includes the ignition, it is easy to manufacture, and a pressure resistance which is necessary for a normal ignition can be set at a lower value. Further, a degree of air-tightness can be enhanced by reducing the number of sealed portions. Also, because the occluding member is disposed in the vicinity of the first vent opening which supplies the combustible fluid mixture into the air bag, it is possible to suppress, to the utmost, the unburnt combustible fluid mixture from being generated.

Further, according to the present invention, because the metal case of the occluding member is provided with the projection, when the static electricity is applied to the igniting means from outside, it is possible to discharge the electricity outside the second chamber.

What is claimed is:

1. A gas generating apparatus for an air bag apparatus for igniting, and burning a combustible fluid to increase its temperature to increase its pressure for inflating an air bag, comprising: accommodating means accommodating said combustible fluid; a vent opening provided in said accommodating means; an occluding member for tightly closing said vent opening, and a container for accommodating said occluding member after said occluding member is broken, wherein said occluding member has an igniting portion, said igniting portion is directed inward of said accommodating means, and a breaking pressure of said occluding member is set lower than a breaking pressure of said accommodating means, further including a container for accommodating said occluding member after said occluding member is broken.

2. A gas generating apparatus for an air bag apparatus for igniting and burning a combustible fluid to increase its temperature to increase its pressure for inflating an air bag, comprising: accommodating means accommodating said combustible fluid; a vent opening provided in said accommodating means; and an occluding member for tightly closing said vent opening, wherein said occluding member has an igniting portion, said igniting portion is directed inward of said accommodating means, and a breaking pressure of said occluding member is set lower than a breaking pressure of said accommodating means, wherein said occluding member comprises a cylindrical metal case having a flange, and a conductive member fixed in said cylindrical metal case through an insulator.

3. A gas generating apparatus for an air bag apparatus according to claim 2, wherein said occluding member is broken from said flange of said metal case.

4. A gas generating apparatus for an air bag apparatus according to claim 2, wherein said metal case is provided with a fragile portion, and said occluding member is broken from said fragile portion of said metal case.

5. A gas generating apparatus for an air bag apparatus according to claim 3 or 4, wherein said accommodating means includes occluding member cutting means.

6. A gas generating apparatus for an air bag apparatus according to claim 2, wherein said occluding member is broken from a joint portion between said metal case and said insulator.

7. A gas generating apparatus for an air bag apparatus according to claim 2, wherein said insulator is provided with a fragile portion, and said occluding member is broken from said fragile portion of said insulator.

8. A gas generating apparatus for an air bag apparatus according to claim 2, further including a container for accommodating said occluding member after said occluding member is broken, and said container includes an edge for cutting said flange of said metal case of said occluding member.

9. A gas generating apparatus for an air bag apparatus according to claim 1 or 8, further including a diffuser which has a plurality of gas diffusing holes and which is disposed at outside of an end surface of said accommodating means such as to surround said vent opening, said container being disposed in said diffuser.

10. A gas generating apparatus for an air bag apparatus for igniting and burning a combustible fluid to increase its temperature to increase its pressure for inflating an air bag, comprising: accommodating means accommodating said combustible fluid; a vent opening provided in said accommodating means; and an occluding member for tightly closing said vent opening, wherein said occluding member has an igniting portion, said igniting portion is directed inward of said accommodating means, and a breaking pressure of said occluding member is set lower than a breaking pressure of said accommodating means, wherein said occluding member comprises:

a dome-like metal case which is provided with a flange and is further provided at a base portion of the metal case with a cylinder; and a conductive member fixed in said cylinder through an insulator.

11. A gas generating apparatus for an air bag apparatus for igniting and burning a combustible fluid to increase its temperature to increase its pressure for inflating an air bag, comprising: accommodating means accommodating said combustible fluid; a vent opening provided in said accommodating means; and an occluding member for tightly closing said vent opening, wherein said occluding member has an igniting portion, said igniting portion is directed inward of said accommodating means, and a breaking pressure of said occluding member is set lower than a breaking pressure of said accommodating means, wherein said occluding member comprises a bottomed cylindrical metal case having a flange, and a conductive member fixed to said metal case through an insulator such that said conductive member passes through said metal case.

12. A gas generating apparatus for an air bag apparatus for igniting and burning a combustible fluid to increase its temperature to increase its pressure for inflating an air bag, comprising: accommodating means accommodating said combustible fluid; a vent opening provided in said accommodating means; a diffuser which has a plurality of gas diffusing holes and which is disposed at outside of an end surface of said accommodating means such as to surround said vent opening, said occluding member being fixed to said diffuser, and an occluding member for tightly closing said vent opening, wherein said occluding member has an igniting portion, said igniting portion is directed inward of said accommodating means, and a breaking pressure of said occluding member is set lower than a breaking pressure of said accommodating means.

13. A gas generating apparatus for an air bag apparatus according to any one of claims 3 to 5 or 7 to 9, wherein that distance of said insulator exposing inside of said accommodating means which is for preventing a creeping discharge between said conductive member and said metal case is greater than that distance of said insulator exposing outside of said accommodating means which is for preventing a creeping discharge between said conductive member and said metal case.

14. A gas generating apparatus for an air bag apparatus according to claim 13, wherein said distance of said insulator exposing outside of said accommodating means is equal to a distance between said conductive member and a projection provided at an opening end of said metal case.

15. A gas generating apparatus for an air bag apparatus according to any one of claims 2 to 4, 6 to 8, or 12, wherein said igniting portion includes a heating element and/or a pyrotechnic material.

16. A gas generating apparatus for an air bag apparatus, comprising: accommodating means for accommodating a combustible fluid; and occluding means for occluding a vent opening provided in said accommodating means and having igniting means for igniting said combustible fluid; wherein said occluding means comprises a conductive material and an insulator, said conductive material and said insulator being connected with each other at least at one portion.

* * * * *